US011297297B2

(12) United States Patent
Cheng (10) Patent No.: US 11,297,297 B2
(45) Date of Patent: Apr. 5, 2022

(54) FOLDED PARALLEL-LIGHT-CHANNEL BASED STEREO IMAGING SYSTEM WITH DISPARITY AND CONVERGENCE ANGLE CONTROL

(71) Applicant: AMCHAEL VISUAL TECHNOLOGY CORPORATION, Hsinchu (TW)

(72) Inventor: Kai Michael Cheng, Lexington, KY (US)

(73) Assignee: AMCHAELVISUAL Technology, LLC, Lexington, KY (US)

(*) Notice: Subject to any disclaimer, the term of this patent is extended or adjusted under 35 U.S.C. 154(b) by 157 days.

(21) Appl. No.: 16/551,080

(22) Filed: Aug. 26, 2019

(65) Prior Publication Data

US 2020/0059636 A1 Feb. 20, 2020

Related U.S. Application Data

(63) Continuation of application No. 15/591,695, filed on May 10, 2017, now abandoned.

(Continued)

(51) Int. Cl.
| | |
|---|---|
| *H04N 13/00* | (2018.01) |
| *H04N 13/128* | (2018.01) |
| *H04N 13/229* | (2018.01) |
| *H04N 13/239* | (2018.01) |
| *G02B 30/27* | (2020.01) |

(52) U.S. Cl.
CPC ........... *H04N 13/128* (2018.05); *G02B 30/27* (2020.01); *H04N 13/229* (2018.05); *H04N 13/239* (2018.05); *H04N 2213/001* (2013.01)

(58) Field of Classification Search
CPC .. H04N 13/128; H04N 13/229; H04N 13/239; H04N 13/10; H04N 13/106; H04N 13/20; H04N 13/204; H04N 13/207; H04N 13/225; H04N 13/232; H04N 2213/001; G02B 30/27; G02B 7/005; G02B 13/0065;

(Continued)

(56) References Cited

U.S. PATENT DOCUMENTS

| | | | |
|---|---|---|---|
| 8,870,379 B2 * | 10/2014 | Choi | G03B 35/26 353/7 |
| 9,019,603 B2 * | 4/2015 | Cheng | G03B 35/10 359/466 |

(Continued)

*Primary Examiner* — Stephone B Allen
*Assistant Examiner* — Jyotsna V Dabbi
(74) *Attorney, Agent, or Firm* — Patrick M. Torre; Stites & Harbison, PLLC (57) ABSTRACT

A stereo imaging system having convergence angle and disparity control includes a pair of pivoting folded-parallel-light-channel (FPLC) units arranged to provide a virtual left side view and a virtual right side view of a scene. Each FPLC unit includes a fixed lens unit adapted to focus reflected light including an image of a scene to an image sensor and a laterally translatable light-redirecting unit including a reflector adapted to define a parallel image reflection path to the fixed lens unit via a collimated light beam defined by substantially parallel light beams. The stereo imaging system further includes a disparity-adjusting mechanism adapted to alter a distance between the pair of pivoting FPLC units and a convergence-angle-adjusting mechanism adapted to pivot the pivoting FPLC units.

23 Claims, 6 Drawing Sheets

Related U.S. Application Data (60) Provisional application No. 62/407,754, filed on Oct. 13, 2016.

(58) Field of Classification Search
CPC .......................... G02B 13/004; G02B 13/007; G02B 13/0075; G02B 27/2214
USPC .......................................................... 348/49
See application file for complete search history.

(56) References Cited

U.S. PATENT DOCUMENTS

| | | | | |
|---|---|---|---|---|
| 9,316,810 B2 * | 4/2016 | Mercado | ............... | G02B 13/002 |
| 2013/0342660 A1 * | 12/2013 | Iwasaki | ................ | H04N 13/239 |
| | | | | 348/47 |
| 2014/0021352 A1 * | 1/2014 | Franzini | ............... | H04N 13/239 |
| | | | | 250/340 |
| 2014/0132707 A1 * | 5/2014 | Hashimoto | ............. | G06T 7/593 |
| | | | | 348/36 |

* cited by examiner

FOLDED PARALLEL-LIGHT-CHANNEL BASED STEREO IMAGING SYSTEM WITH DISPARITY AND CONVERGENCE ANGLE CONTROL

This continuation patent application claims the benefit of U.S. patent application Ser. No. 15/591,695 filed on May 10, 2017, which in turn claims priority to U.S. Provisional Patent Application Ser. No. 62/407,754 filed on Oct. 13, 2016, the entirety of the disclosures of which are incorporated herein by reference.

TECHNICAL FIELD

The present disclosure relates to stereo imaging. More specifically, this disclosure pertains to a compact folded-parallel-light-channel (FPLC) stereo imaging system synchronously generating a left view and a right view of a scene, and also providing both disparity and convergence angle control. The disclosed stereo imaging system finds utility in a variety of devices including compact mobile devices such as cell phones and smartphones.

BACKGROUND OF THE INVENTION

Figure 1:
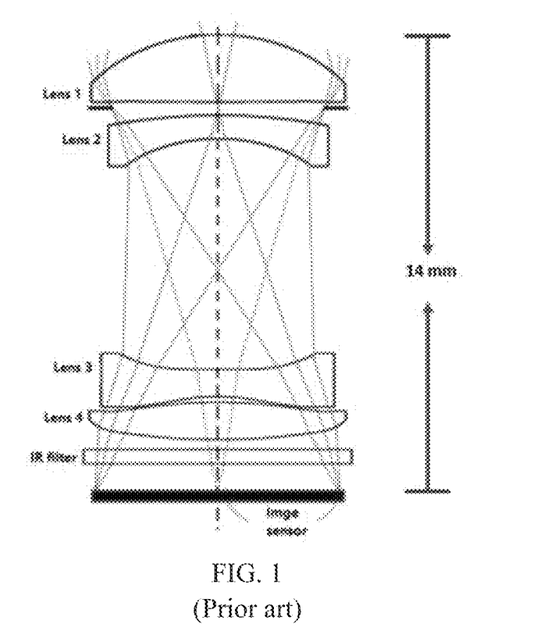
FIG. 1 depicts a prior art imager for a mobile device such as a cellphone or smartphone.

A critical point in designing an embedded imaging system for a handheld or other mobile device such as a smartphone is to ensure the height (thickness) of the imaging system is smaller than (or, at least, close to) the thickness of the cell phone. The image sensor of a cell phone imaging system is of a fixed dimension (4.80×3.60 mm). To ensure images of the same size as the image sensor are produced, one cannot unlimitedly reduce the sizes of the lenses used in a cell phone imaging system. Hence, a telephoto camera usually cannot be used for a mobile device such as a smartphone since such a camera when equipped with camera comprising a plurality of lenses disposed to refract light to form an image at a cell phone camera image sensor (CPCIS), would require at least 14 mm for its height (see FIG. 1 for an example) while the thickness of a typical smartphone is between 7 and 9 mm only.

To allow a telephoto camera equipped with a CPCIS to be embedded in a smartphone, prior art devices are known (see FIG. 2) wherein the telephoto camera is "folded" by inserting a light-folding mirror in the lens system so that the optical axis (see dotted line) is redirected from vertical to horizontal once it reaches the folding mirror. The image sensor is installed on an orientation defining a plane oriented vertically to a plane defined by the ground, instead of parallel to a plane defined by the ground. By folding a telephoto camera equipped with a CPCIS in this manner, the height of the camera can be made as small as 7 mm and consequently can be embedded into a smart cell phone. As examples, see U.S. Pat. No. 9,316,810 to Mercado and U.S. Pat. No. 9,172,856 to Bohn et al., the entire disclosures of each of which are incorporated herein by reference.

Figure 2:
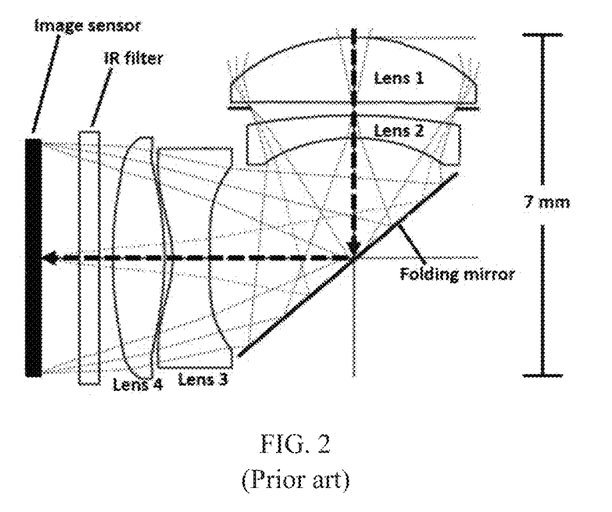
FIG. 2 depicts a prior art folded light-path imager for a mobile device such as a cellphone or smartphone.
Figure 3:
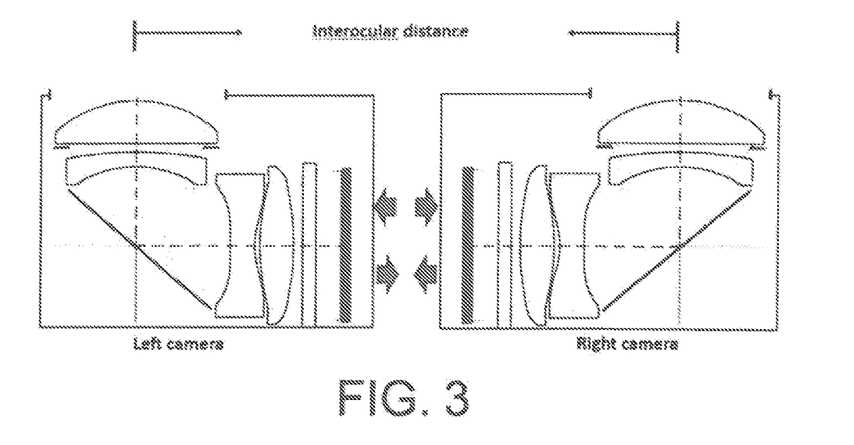
FIG. 3 illustrates a hypothetical stereo imager derived from the imager of FIG. 2.

In theory, a stereo imaging system could be provided by arranging two identical imaging systems such as those shown in FIG. 2 symmetrically as shown in FIG. 3. Such a hypothetical stereo imaging system could be embedded in a mobile device such as a smartphone completely. However, the only way to provide disparity (interocular distance) control for such a stereo imaging system would be to configure each of the left and right imaging systems to translate laterally in their entirety relative to one another. This is illustrated in FIG. 3. Such an arrangement, while hypothetically configurable, would require additional packaging space potentially not available in small mobile devices such as smartphones.

Accordingly, a need in the art is identified for improvements to imaging systems for small mobile devices, providing stereo imaging systems including such convergence and disparity control. The following disclosure describes a folded-parallel-light-channel stereo imaging system for a mobile device configured to allow disparity and convergence angle control without requiring motion of each entire unit relative to one another.

SUMMARY OF THE INVENTION

To solve the foregoing problems and address the identified need in the art, in one aspect of the present disclosure a stereo imaging system having convergence angle and disparity control is provided, comprising a pair of pivoting folded-parallel-light-channel (FPLC) units arranged to provide a virtual left side view and a virtual right side view of a scene. Each FPLC unit comprises a fixed lens unit adapted to focus reflected light comprising an image of a scene to an image sensor, and a laterally translatable light-redirecting unit comprising a reflector adapted to define a parallel image reflection path to the fixed lens unit via a collimated light beam comprising substantially parallel light beams. The stereo imaging system further includes a disparity-adjusting mechanism adapted to alter a distance between the pair of pivoting FPLC units and a convergence-angle-adjusting mechanism adapted to pivot the pivoting FPLC units.

In embodiments, the disparity-adjusting mechanism comprises a first actuator operatively connected to a cam assembly. In embodiments, the convergence-angle-adjusting mechanism comprises a second actuator adapted to pivot a pair of pivoting housings each respectively carrying a one of the pair of FPLC units.

In embodiments, the reflector defines a planar reflective surface. A concave lens may be disposed between the reflector and an image inlet of each of the pair of FPLC units. This concave lens defines a lens field of view that is the same as a field of view of the fixed lens unit. In alternative embodiments, the reflector defines an arcuate reflective surface. The arcuate reflective surface may be configured to define a reflector field of view that is the same as a field of view of the fixed lens unit. In embodiments, the fixed lens unit defines a wide-angle lens unit. In alternative embodiments, the fixed lens unit defines a telephoto lens unit.

In another aspect, a stereo imaging system having convergence angle and disparity control is provided, comprising a pair of pivoting folded-parallel-light-channel (FPLC) units arranged to provide a virtual left side view and a virtual right side view of a scene. Each FPLC unit comprises a fixed lens unit adapted to focus reflected light comprising an image of a scene to an image sensor and a laterally translatable light-redirecting unit comprising a planar reflector adapted to define a parallel image reflection path to the fixed lens unit via a collimated light beam comprising substantially parallel light beams. The disclosed system further includes a disparity-adjusting mechanism adapted to alter a distance between the pair of pivoting FPLC units and a convergence-angle-adjusting mechanism adapted to pivot the pivoting FPLC units. The disparity-adjusting mechanism and the convergence-angle-adjusting mechanism may be as described above.

In yet another aspect, a stereo imaging system having convergence angle and disparity control is provided, comprising a pair of pivoting folded-parallel-light-channel (FPLC) units arranged to provide a virtual left side view and a virtual right side view of a scene. Each FPLC unit comprises a fixed lens unit adapted to focus reflected light comprising an image of a scene to an image sensor and a laterally translatable light-redirecting unit comprising an arcuate reflector adapted to define a parallel image reflection path to the fixed lens unit via a collimated light beam comprising substantially parallel light beams. The disclosed system further includes a disparity-adjusting mechanism adapted to alter a distance between the pair of pivoting FPLC units and a convergence-angle-adjusting mechanism adapted to pivot the pivoting FPLC units. The disparity-adjusting mechanism and the convergence-angle-adjusting mechanism may be as described above.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

Figure 4:
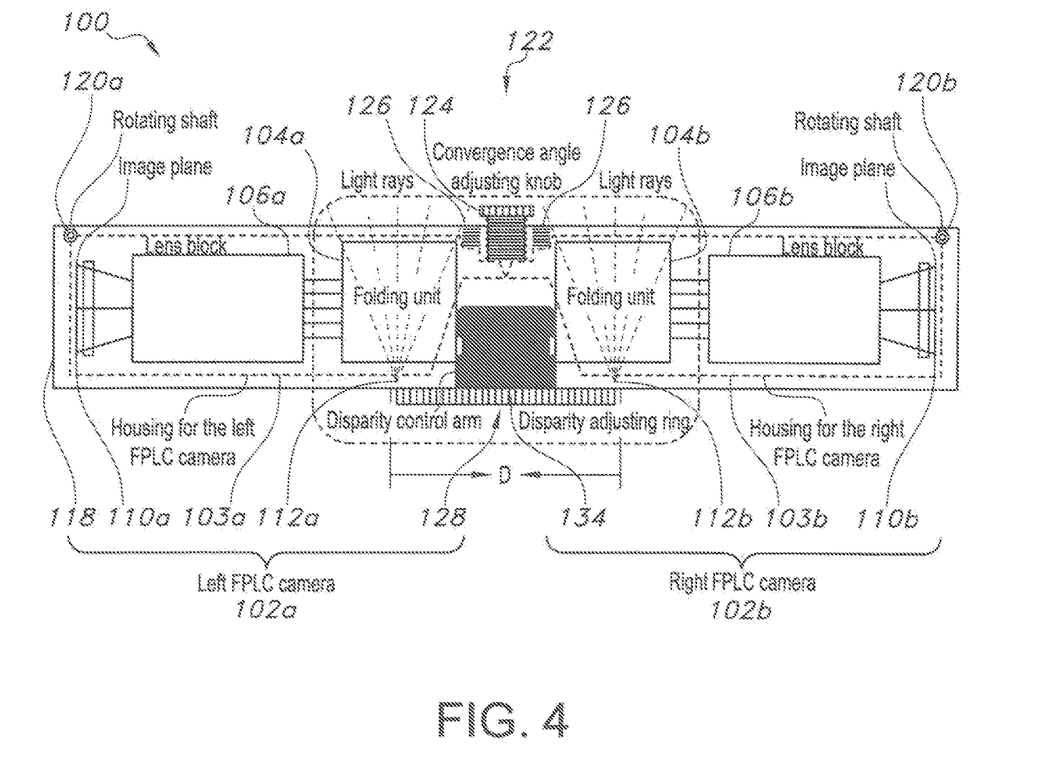
FIG. 4 schematically illustrates a stereo imaging system according to the present disclosure.
Figure 5:
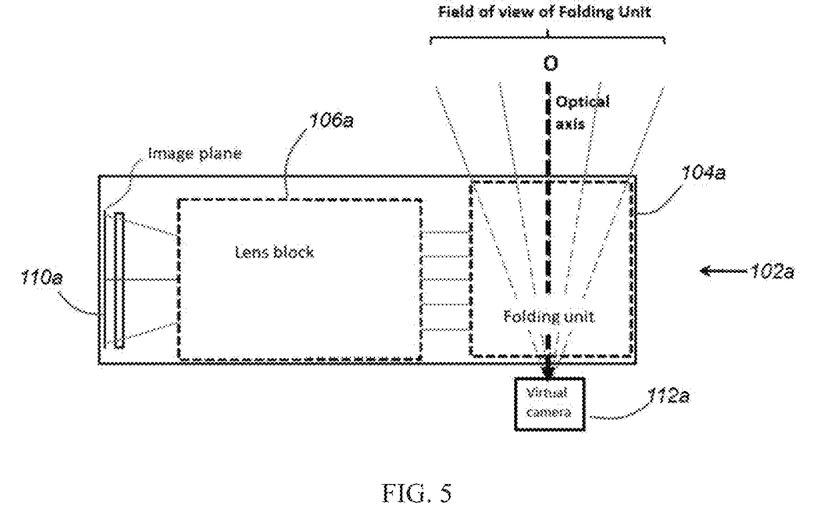
FIG. 5 shows in isolation a folded-parallel-light-channel-based camera unit for use in the stereo imaging system of FIG. 4.

The present disclosure is directed to a stereo imaging system 100 for a mobile device that not only has a lesser thickness dimension, but is also provided with the capacity of disparity and convergence angle control. With reference to FIGS. 4 and 5, the stereo imaging system 100 includes two substantially identical FPLC based camera units 102a, 102b disposed symmetrically to synchronously generate a left view and a right view of a scene viewed by the stereo imaging system. Each FPLC-based camera unit 102a, 102b is contained in a separate pivotable housing 103a, 103b. The FPLC-based camera units 102a, 102b each include a light-folding unit 104a, 104b to fold a light path (see dotted lines) entering the FPLC-based camera, and a multiple-lens block unit 106a, 106b to form images. Light rays entering the light-folding unit 104a, 104b of the FPLC-based camera 102a, 102b on a first light path are redirected by a folding element 108a, 108b (not shown in this view) on to a second light path as a collimated light beam comprising parallelly-oriented light rays (see solid lines). The folding element 108a, 108b may include a flat reflective surface or a curved reflective surface. The parallelly-oriented light rays of the collimated light beam are then refracted by lenses (not shown in this view) of the multiple-lens block unit 106a, 106b in the second light path to form an image at an image sensor 110a, 110b. As will be described, each FPLC based camera 102a, 102b may be configured to provide a telephoto lens system embodiment or a wide-angle lens system embodiment. Each embodiment satisfies the requirement of parallelly-oriented light ray transmission between the light-folding unit 104a, 104b and the multiple-lens block unit 106a, 106b.

As shown representatively in FIG. 5, each FPLC-based camera unit 102a, 102b by its configuration respectively defines a virtual camera 112a, 112b (only virtual camera 112a is shown in the drawing figure) which represents, respectively, a left or a right view of the scene as transmitted to each image sensor 110a, 110b.

In either embodiment, disparity of the left view and the right view of the stereo imaging system 100 can be adjusted by adjusting a distance between the light-folding units 104a, 104b of the two FPLC based camera units 102a, 102b. Likewise, a convergence angle of the left view and the right view of the stereo imaging system 100 can be adjusted by adjusting an angle between the left FPLC based camera unit 102a and the right FPLC based camera unit 102b. Mechanisms for effecting these adjustments will be described below.

Figure 7:
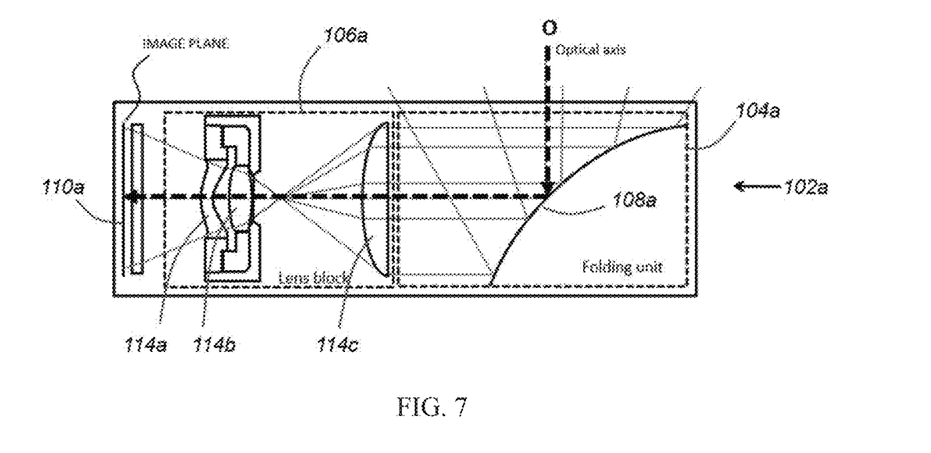
FIG. 7 shows in isolation a folded-parallel-light-channel-based camera unit for use in the stereo imaging system of FIG. 4, comprising a folding unit having a curved reflective surface and a multiple-lens block unit comprising three lenses.
Figure 8:
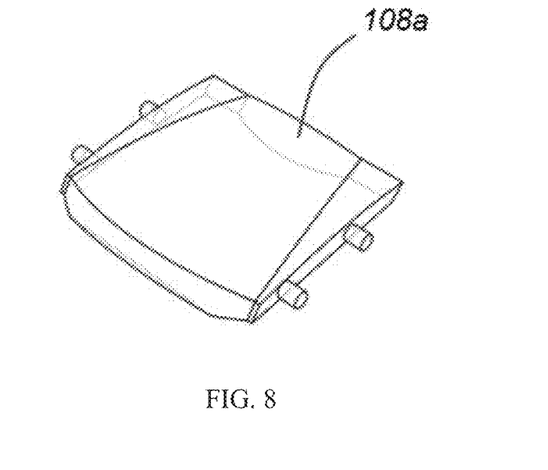
FIG. 8 shows a curved reflector for use in the camera unit of FIG. 7.
Figure 9:
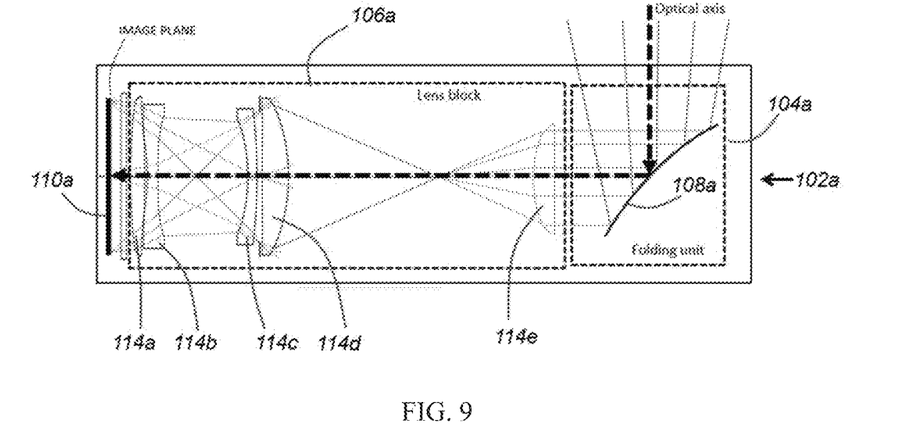
FIG. 9 shows in isolation a folded-parallel-light-channel-based camera unit for use in the stereo imaging system of FIG. 4, comprising a folding unit having a curved reflective surface and a multiple-lens block unit comprising five lenses.

FIGS. 7, 8, and 9 illustrate implementation of FPLC-based camera units 102a, 102b comprising folding element 108a, 108b having curved reflective surfaces. In the embodiment depicted in FIG. 7, the multiple-lens block unit 106a comprises three lenses 114a, 114b, 114c. In the embodiment depicted in FIG. 9, the multiple-lens block unit 106a comprises five lenses 114a, 114b, 114c, 114d, and 114e. As will be appreciated, the curved folding elements 108a, 108b are provided having a curvature whereby a field of view of the curved folding elements 108a, 108b is the same as that of a field of view of the multiple-lens block units 106a, 106b. In this embodiment, the field of view of the curved folding elements 108a, 108b defines the field of view of the FPLC-based camera units 102a, 102b.

Figure 10:
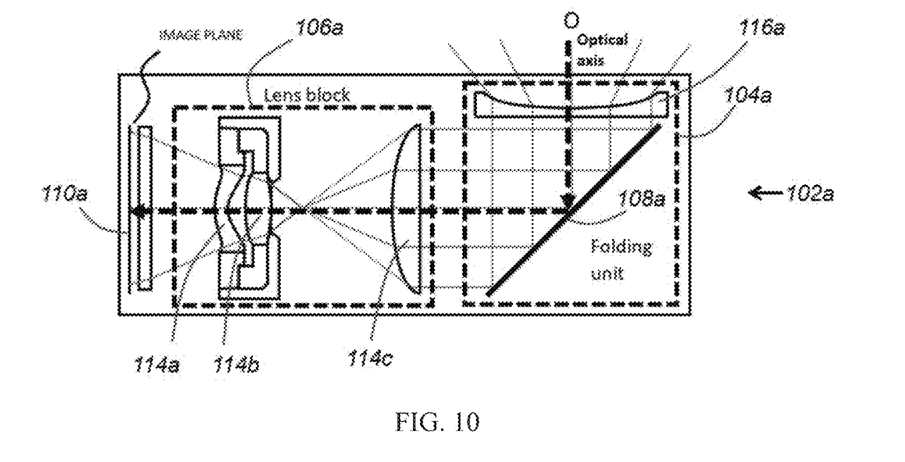
FIG. 10 shows in isolation a folded-parallel-light-channel-based camera unit for use in the stereo imaging system of FIG. 4, comprising a folding unit having a planar reflective surface and a multiple-lens block unit comprising three lenses.
Figure 11:
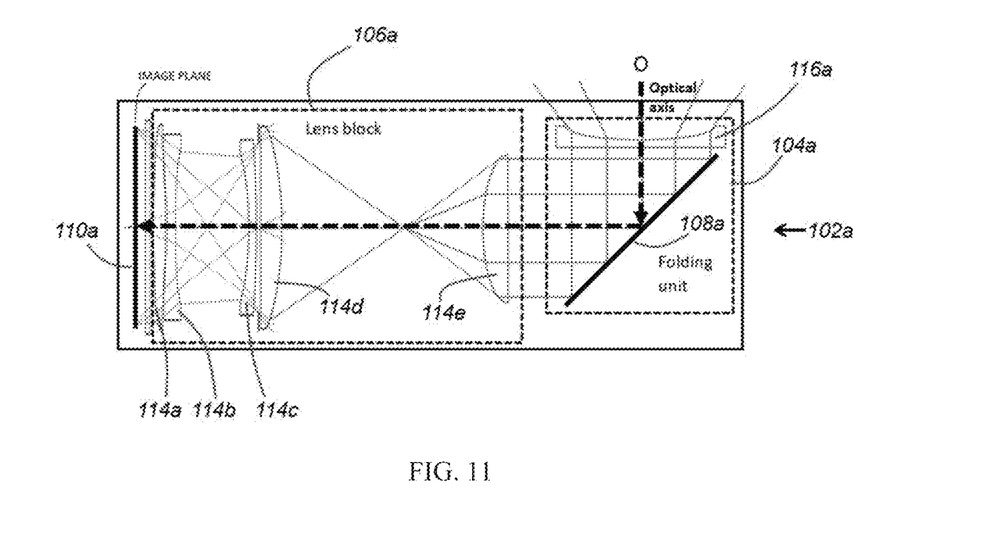
FIG. 11 shows in isolation a folded-parallel-light-channel-based camera unit for use in the stereo imaging system of FIG. 4, comprising a folding unit having a planar reflective surface and a multiple-lens block unit comprising five lenses.

FIGS. 10 and 11 illustrate implementation of FPLC-based camera units 102a, 102b comprising folding elements 108a, 108b having planar reflective surfaces. FIG. 10 shows an FPLC-based camera unit 102a having a multiple-lens block unit 106a comprising three lenses 114a, 114b, 114c, whereas FIG. 11 shows an FPLC-based camera unit 102a having a multiple-lens block unit 106a comprising five lenses 114a, 114b, 114c, 114d, and 114e. In these embodiments, concave lenses 116a, 116b (only lens 116a shown in the drawings) are provided as part of the light-folding units 104a, 104b, disposed in the light path entering the FPLC-based camera units. As will be appreciated, the concave lenses 116a, 116b are provided having a curvature whereby a field of view of the concave lenses 116a, 116b is the same as that of a field of view of the multiple-lens block units 106a, 106b. In this embodiment, the field of view of the concave lenses 116a, 116b defines the field of view of the FPLC-based camera units 102a, 102b.

As will be appreciated, by ensuring that the field of view of the light folding units 104a, 104b is the same as that of the multiple-lens block units 106a, 106b as described above, the multiple-lens block units 106a, 106b are able to provide an image of a scene that is the same size as that of the image sensors 110a, 110b. Further, because of the parallel path of travel of light rays from the light-folding elements 108a, 108b to the multiple-lens block units 106a, 106b, the fields of view of the light folding units 104a, 104b are independent of the spacing or distance of the light folding units from the multiple lens block units 106a, 106b. By this feature, adjustment of disparity without requiring movement of the multiple-lens block units 106a, 106b and/or the image sensors 110a, 110b is made possible by the mechanisms described below.

FIGS. 7 and 10 illustrate wide-angle multiple lens block units 106a, 106b paired respectively with curved and planar light-folding units 104a, 104b. In turn, FIGS. 9 and 11 illustrate telephoto multiple-lens block units 106a, 106b paired respectively with curved and planar light-folding units 104a, 104b. In each case, the field of view of the light-folding units 104a, 104b is the same as that of the field of view of the multiple-lens block units 106a, 106b. It will be appreciated, however, that the described stereo imaging system 100 is not limited to wide-angle and telephoto lens systems, but instead may be configured with any suitable lens system wherein the light-folding units 104a, 104b can be configured with a same field of view as the multiple-lens block units 106a, 106b such that the multiple-lens block units can produce an image of a scene that is the same size as the image sensors 110a, 110b comprised in the stereo imaging system.

As described above in the discussion of FIGS. 4 and 5, the light-folding units 104a, 104b define virtual cameras 112a, 112b, described respectively in reference to an orientation of the stereo imaging system 100 as the left and right virtual camera 112a, 112b. The distance D (see FIG. 4 and FIG. 6) between the left and right virtual camera 112a, 112b is variously called the interocular distance, virtual camera distance, virtual camera disparity, or simply disparity. It is this distance D that determines the disparity between a left view and a right view of a scene. In turn, each virtual camera 112a, 112b has a line of sight, referred to as the optical axis O (see FIGS. 5, 7, and 9-11). The angle between the optical axes of the virtual cameras 112a, 112b is called the convergence angle A (see FIG. 6). Advantageously, the described stereo imaging system 100 of the present disclosure provides for adjustment of both the interocular distance/disparity and convergence angle.

Figure 6:
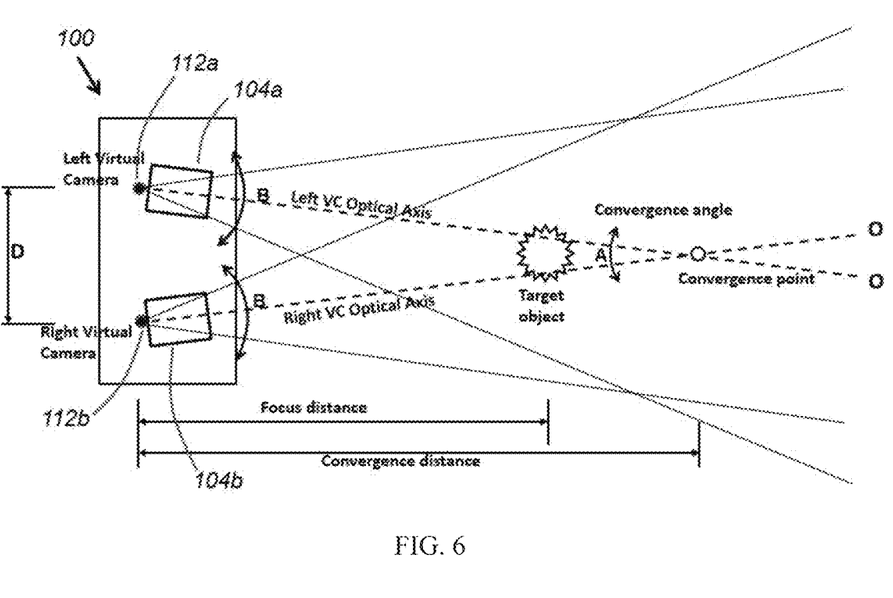
FIG. 6 shows operation of a convergence angle adjusting mechanism for the stereo imaging system of FIG. 4.

With regard to adjustment of convergence angle, referring back to FIG. 4 and to FIG. 6, each FPLC-based camera unit 102a, 102b housing 103a, 103b is pivotally (see FIG. 6, arrows B) attached to a stereo imaging system housing 118. In the depicted embodiment, the FPLC-based camera units 102a, 102b are respectively pivotally attached to the stereo imaging system housing 118 by a rotating shaft 120a, 120b. A convergence-angle-adjusting mechanism 122 is provided, in the depicted embodiment comprising a biasing actuator 124 and at least two biasing members 126. Rotating the biasing actuator 124 in a first direction will urge each camera unit housing 103a, 103b to rotate about an axis defined by the rotating shafts 120a, 120b, thus altering an angle between the FPLC-based camera unit 102a, 102b optical axes O and so altering a convergence angle of the stereo imaging system 100. Rotating the biasing actuator 124 in a second, opposed direction will return the camera unit housings to their original orientations, assisted by the biasing actions of the biasing members 126. In turn, the biasing action of the biasing members 126 ensures stability of the adjusting process.

Figure 12:
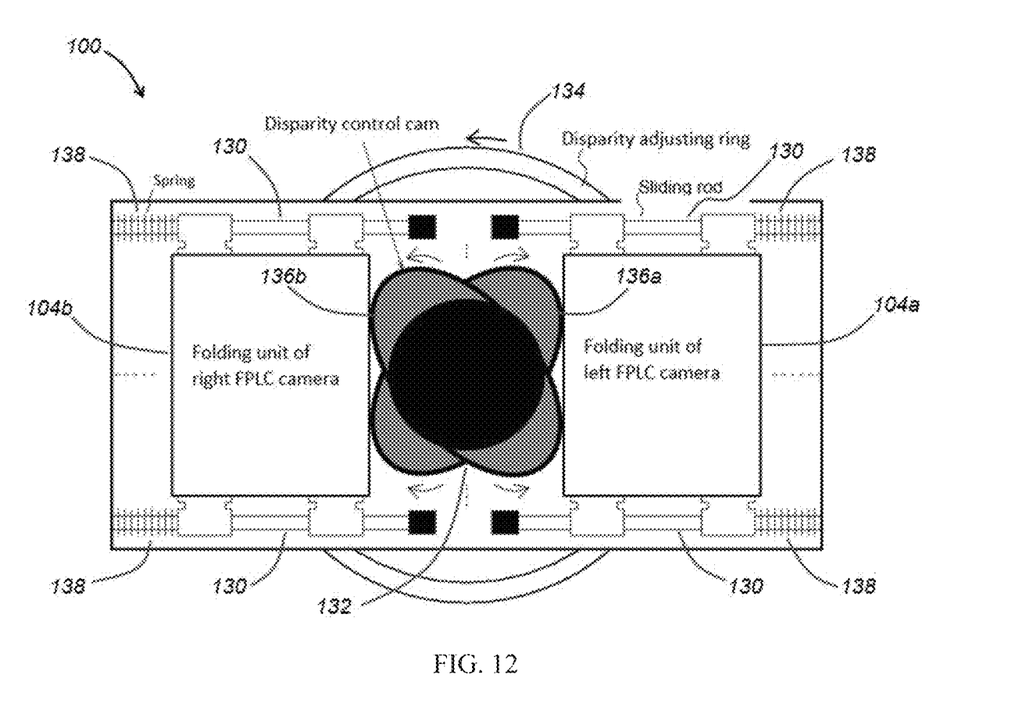
FIG. 12 illustrates a disparity adjusting mechanism for the stereo imaging system of FIG. 4.

With reference to FIGS. 4 and 12, a disparity adjusting mechanism 128 is also provided. In the depicting embodiment, the disparity adjusting mechanism 128 comprises an arrangement of guide rods 130 to which each light folding unit 104a, 104b is slidingly attached. A cam array 132 is provided, disposed between each light folding unit 104a, 104b and under control of a disparity adjusting actuator 134. In the depicted embodiment, the cam array 132 comprises a pair of elliptical cams 136a, 136b disposed whereby actuating the disparity adjusting actuator 134 causes the cams 136a, 136b to rotate in opposed directions (see arrows). As will be appreciated, this will bias the light folding units 104a, 104b, translating them laterally to increase a distance therebetween. In turn, a plurality of biasing members 138, in the depicted embodiment being springs concentrically around each guide rod 130, are disposed to bias the light folding units 104a, 104b towards one another in an opposite direction to the biasing force imposed by the cam array 132. Thus, by this disparity adjusting mechanism 128 the light folding units 104a, 104b may be translated laterally to alter a distance therebetween, and by this mechanism disparity can be controlled for the stereo imaging system 100. Likewise, the biasing members 138 provide stability to the disparity adjusting process.

Summarizing, the present disclosure provides a stereo imaging system 100 wherein a width/height dimension of the system is minimized, and so the described stereo imaging system is readily adapted to small mobile devices such as smartphones. In turn, because the described light folding units 104a, 104b reflect light/images to the multiple lens block units 106a, 106b as a collimated light beam comprising parallel light rays, the field of view of the light folding units 104a, 104b is independent of any distance between the light folding units and the multiple-lens block units. Thus, disparity control is possible for the stereo imaging system 100 without requiring movement of the multiple lens block units 106a, 106b and/or the image sensors 110a, 110b. This further contributes to the compact design of the described stereo imaging system 100. Still more, by the described mechanisms convergence angle control is made possible, i.e., adjusting an angle between optical axes of the virtual cameras 112a, 112b defined by the system. The images captured by image sensors 110a, 110b representing respectively a left and a right view of a scene can then be processed to provide stereoscopic images and/or image-plus-depth images, i.e. three-dimensional images. Likewise, use of the described system to provide still images and video images in stereo and/or image-plus-depth is contemplated. A number of suitable methods, systems, and computer program products for processing images to provide stereoscopic and/or image-plus-depth images are known and contemplated for use herein, including without intending any limitation the methods described in U.S. Pat. Nos. 8,648,808, 8,964,004, 9,201,519, and 9,310,857, the disclosures of which are incorporated herein by reference in their entirety. In turn, the described system is readily adaptable of other camera types, including without intending any limitation compact dual-lens reflex cameras.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A stereo imaging system having convergence angle and disparity control, comprising:
    a pair of pivoting folded-parallel-light-channel (FPLC) units arranged to provide a virtual left side view and a virtual right side view of a scene, each FPLC unit comprising:
        a) a fixed lens unit adapted to focus reflected light comprising an image of a scene to an image sensor, and
        b) a laterally translatable light-redirecting unit comprising a reflector adapted to define a parallel image reflection path to the fixed lens unit via a collimated light beam comprising substantially parallel light beams along the stereo imaging system y-axis;
    a disparity-adjusting mechanism adapted to alter a distance between the laterally translatable light-redirecting units of the pair of pivoting FPLC units; and
    a convergence-angle-adjusting mechanism adapted to pivot the pivoting FPLC units;
    wherein the stereo imaging system is adapted to consolidate two-dimensional images into a single three-dimensional image.

2. The stereo imaging system according to claim 1, wherein the disparity-adjusting mechanism comprises a first actuator operatively connected to a cam assembly.

3. The stereo imaging system according to claim 2, wherein the convergence-angle-adjusting mechanism comprises a second actuator adapted to pivot a pair of pivoting housings each respectively carrying a one of the pair of FPLC units.

4. The stereo imaging system according to claim 1, wherein the reflector defines a planar reflective surface.

5. The stereo imaging system according to claim 4, further including a concave lens disposed between the reflector and an image inlet of each of the pair of FPLC units.

6. The stereo imaging system according to claim 5, wherein the concave lens defines a lens field of view that is the same as a field of view of the fixed lens unit.

7. The stereo imaging system according to claim 1, wherein the reflector defines an arcuate reflective surface.

8. The stereo imaging system according to claim 7, wherein the arcuate reflective surface is configured to define a reflector field of view that is the same as a field of view of the fixed lens unit.

9. The stereo imaging system according to claim 1, wherein the fixed lens unit defines a wide-angle lens unit.

10. The stereo imaging system according to claim 1, wherein the fixed lens unit defines a telephoto lens unit.

11. A stereo imaging system having convergence angle and disparity control, comprising:
    a pair of pivoting folded-parallel-light-channel (FPLC) units arranged to provide a virtual left side view and a virtual right side view of a scene, each FPLC unit comprising:
        a) a fixed lens unit adapted to focus reflected light comprising an image of a scene to an image sensor, and
        b) a laterally translatable light-redirecting unit comprising a planar reflector adapted to define a parallel image reflection path to the fixed lens unit via a collimated light beam comprising substantially parallel light beams along the stereo imaging system y-axis;
    a disparity-adjusting mechanism adapted to alter a distance between the laterally translatable light-redirecting units of the pair of pivoting FPLC units; and
    a convergence-angle-adjusting mechanism adapted to pivot the pivoting FPLC units;
    wherein the stereo imaging system is adapted to consolidate two-dimensional images into a single three-dimensional image.

12. The stereo imaging system according to claim 11, wherein the disparity-adjusting mechanism comprises a first actuator operatively connected to a cam assembly.

13. The stereo imaging system according to claim 12, wherein the convergence-angle-adjusting mechanism comprises a second actuator adapted to pivot a pair of pivoting housings each respectively carrying a one of the pair of FPLC units.

14. The stereo imaging system according to claim 11, further including a concave lens disposed between the planar reflector and an image inlet of each of the pair of FPLC units.

15. The stereo imaging system according to claim 14, wherein the concave lens defines a lens field of view that is the same as a field of view of the fixed lens unit.

16. The stereo imaging system according to claim 11, wherein the fixed lens unit defines a wide-angle lens unit.

17. The stereo imaging system according to claim 11, wherein the fixed lens unit defines a telephoto lens unit.

18. A stereo imaging system having convergence angle and disparity control, comprising:
- a pair of pivoting folded-parallel-light-channel (FPLC) units arranged to provide a virtual left side view and a virtual right side view of a scene, each FPLC unit comprising:
  - a) a fixed lens unit adapted to focus reflected light comprising an image of a scene to an image sensor, and
  - b) a laterally translatable light-redirecting unit comprising an arcuate reflector adapted to define a parallel image reflection path to the fixed lens unit via a collimated light beam comprising substantially parallel light beams along the stereo imaging system y-axis;
- a disparity-adjusting mechanism adapted to alter a distance between the laterally translatable light-redirecting units of the pair of pivoting FPLC units; and
- a convergence-angle-adjusting mechanism adapted to pivot the pivoting FPLC units;

wherein the stereo imaging system is adapted to consolidate two-dimensional images into a single three-dimensional image.

19. The stereo imaging system according to claim 18, wherein the disparity-adjusting mechanism comprises a first actuator operatively connected to a cam assembly.

20. The stereo imaging system according to claim 19, wherein the convergence-angle-adjusting mechanism comprises a second actuator adapted to pivot a pair of pivoting housings each respectively carrying a one of the pair of FPLC units.

21. The stereo imaging system according to claim 18, wherein the arcuate reflective surface is configured to define a reflector field of view that is the same as a field of view of the fixed lens unit.

22. The stereo imaging system according to claim 18, wherein the fixed lens unit defines a wide-angle lens unit.

23. The stereo imaging system according to claim 18, wherein the fixed lens unit defines a telephoto lens unit.

* * * * *